United States Patent
Dai et al.

(10) Patent No.: US 8,909,787 B2
(45) Date of Patent: Dec. 9, 2014

(54) METHOD, DEVICE, AND SYSTEM FOR ALLOCATING ADDRESS IN IP NETWORK

(75) Inventors: Yuehua Dai, Shenzhen (CN); Yong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 354 days.

(21) Appl. No.: 13/438,364

(22) Filed: Apr. 3, 2012

(65) Prior Publication Data

US 2012/0191825 A1 Jul. 26, 2012

Related U.S. Application Data

(63) Continuation of application No. PCT/CN2011/075233, filed on Jun. 3, 2011.

(30) Foreign Application Priority Data

Oct. 21, 2010 (CN) .......................... 2010 1 0526872

(51) Int. Cl.
*G06F 15/173* (2006.01)
*H04L 29/12* (2006.01)

(52) U.S. Cl.
CPC ...... *H04L 61/6068* (2013.01); *H04L 29/12283* (2013.01); *H04L 29/12915* (2013.01); *H04L 29/12933* (2013.01); *H04L 61/2015* (2013.01); *H04L 61/2061* (2013.01); *H04L 61/6059* (2013.01)
USPC ............ 709/226; 709/203; 709/223; 709/245

(58) Field of Classification Search
CPC .................. H04L 29/12283; H04L 29/12915; H04L 29/12933; H04L 61/6068; H04L 61/2061; H04L 61/6059; H04L 61/2015
USPC .................. 709/223, 226, 203, 245
See application file for complete search history.

(56) References Cited

U.S. PATENT DOCUMENTS

| | | | |
|---|---|---|---|
| 6,539,019 B1 | 3/2003 | Noy et al. | |
| 7,443,880 B2 | 10/2008 | Wetterwald et al. | |
| 7,454,519 B2 * | 11/2008 | Smith et al. | 709/238 |
| 7,586,912 B2 | 9/2009 | Agarwal et al. | |
| 7,633,884 B2 * | 12/2009 | Kang | 370/254 |

(Continued)

FOREIGN PATENT DOCUMENTS

| | | |
|---|---|---|
| CN | 1897589 | 1/2007 |
| CN | 101626406 | 1/2010 |

(Continued)

OTHER PUBLICATIONS

EPO Extended European Search Report dated Jul. 23, 2012, issued in related European Application No. 11786115.3, Huawei Technologies Co., Ltd. (8 pages).

(Continued)

*Primary Examiner* — Oanh Duong

(57) ABSTRACT

A method for allocating an address in an IP network includes: receiving, by a server, a request message from a client, where the client is connected to the server through at least one routing device, and the request message received by the server carries a device identifier of a preceding stage routing device of the client; obtaining, by the server, according to the device identifier of the preceding stage routing device, a first address prefix pool that is pre-allocated to the preceding stage routing device, and allocating a second address prefix pool to the client according to the first address prefix pool, where an address range corresponding to the second address prefix pool falls within an address range corresponding to the first address prefix pool; and sending, by the server, the second address prefix pool to the client.

9 Claims, 2 Drawing Sheets

(56) References Cited

U.S. PATENT DOCUMENTS

| | | | |
|---|---|---|---|
| 7,836,182 B1* | 11/2010 | Scano | 709/226 |
| 8,254,320 B2* | 8/2012 | Berzin | 370/329 |
| 8,681,695 B1* | 3/2014 | Krishnan | 370/328 |
| 2002/0031107 A1* | 3/2002 | Li et al. | 370/338 |
| 2003/0154307 A1* | 8/2003 | Puthiyandyil et al. | 709/245 |
| 2005/0083859 A1* | 4/2005 | Kang | 370/254 |
| 2008/0089301 A1* | 4/2008 | Choi et al. | 370/338 |
| 2008/0244090 A1* | 10/2008 | Zhu et al. | 709/242 |
| 2010/0211659 A1* | 8/2010 | Chen et al. | 709/221 |
| 2011/0134869 A1* | 6/2011 | Hirano et al. | 370/329 |
| 2011/0296027 A1* | 12/2011 | Salmela et al. | 709/226 |

FOREIGN PATENT DOCUMENTS

| | | |
|---|---|---|
| CN | 101651662 | 2/2010 |
| CN | 101753633 | 6/2010 |
| EP | 1909452 A1 | 4/2008 |

OTHER PUBLICATIONS

Droms, Ralph, et al., "DHCPv6 Relay Agent Information Option", DHC Working Group, Internet-Draft, Oct. 1, 2004 (14 pages).

Sarikaya, B., et al., "DHCPv6 Prefix Delegation as IPv6 Migration Tool in Mobile Networks", Network Working Group, Internet-Draft, Oct. 12, 2010 (14 pages).

Yeh, L., et al., "Prefix Pool Option for DHCPv6 Relay Agent", DHC, Internet-Draft, Oct. 13, 2010 (8 pages).

PCT International Search Report (ISR) mailed Sep. 15, 2011, issued in related International Application No. PCT/CN2011/075233, Huawei Technologies Co., Ltd. (3 pages).

O. Troan, et al., IPv6 Prefix Options for Dynamic Host Configuration Protocol (DHCP) version 6, Network Working Group, Standards Track, RFC 3633, Dec. 2003 (19 pages).

R. Droms, et al., Dynamic Host Configuration Protocol for IPv6 (DHCPv6), Network Working Group, Standards Track, RFC 3315, Jul. 2003 (101 pages).

R. Droms, et al., DHCPv6 Relay Agent Assignment Notification (RAAN) Option, Internet-Draft, Jul. 13, 2009 (9 pages).

Partial translation of Office Action dated Jan. 14, 2013 in connection with Chinese Patent Application No. 201010526872.3.

\* cited by examiner

METHOD, DEVICE, AND SYSTEM FOR ALLOCATING ADDRESS IN IP NETWORK

CROSS-REFERENCE TO RELATED APPLICATIONS

This application is a continuation of International Application No. PCT/CN2011/075233, filed on Jun. 3, 2011, which claims priority to Chinese Patent Application No. 201010526872.3, filed on Oct. 21, 2010, both of which are hereby incorporated by reference in their entireties.

FIELD OF THE INVENTION

The embodiments of the present invention relate to communications technologies, and in particular, to a method, a device, and a system for allocating an address in an IP network.

BACKGROUND OF THE INVENTION

Versions of the Internet Protocol (Internet Protocol, referred to as IP) may be classified into two types: IPv4 and IPv6. An IPv4 address prefix pool is allocated by using a dynamic host configuration protocol (Dynamic Host Configuration Protocol, referred to as DHCP). A routing device between a client (client) and a DHCP server (DHCP server) may apply to a preceding stage (a DHCP server or a preceding stage routing device) for an IPv4 address prefix pool stage by stage, and then allocates the IPv4 address prefix pool to a following stage (a following stage routing device or a client) stage by stage. An IPv6 address prefix pool is allocated by using an IPV6 dynamic host configuration protocol (Dynamic Host Configuration Protocol for IPv6, referred to as DHCPv6). A routing device between a client (client) and a DHCPv6 server (DHCPv6 server) may apply to a preceding stage (a DHCPv6 server or a preceding stage routing device) for an IPv6 address prefix pool stage by stage, and then allocates the IPv6 address prefix pool to a following stage (a following stage routing device or a client) stage by stage.

Each routing device between a client and a DHCP server/DHCPv6 server needs to be configured with configuration information for allocating an address prefix pool to a following stage routing device or the client. Because of different configuration information, complexity of a configuration operation is increased and efficiency of improving address allocation is decreased.

SUMMARY OF THE INVENTION

Embodiments of the present invention provide a method, a device, and a system for allocating an address in an IP network, so as to decrease complexity of a configuration operation and improve efficiency of allocating an address.

An embodiment of the present invention provides a method for allocating an address in an IP network, which includes:

receiving, by a server, a request message from a client, where the client is connected to the server through at least one routing device, and the request message received by the server carries a device identifier of a preceding stage routing device of the client;

obtaining, by the server, according to the device identifier of the preceding stage routing device, a first address prefix pool that is pre-allocated to the preceding stage routing device, allocating a second address prefix pool to the client according to the first address prefix pool, where an address range corresponding to the second address prefix pool falls within an address range corresponding to the first address prefix pool; and sending, by the server, the second address prefix pool to the client.

An embodiment of the present invention further provides a device for allocating an address in an IP network. The device for allocating an address is connected to a client through at least one routing device, and the device for allocating an address includes:

an interface module, configured to receive a request message from a client, where the request message carries a device identifier of a preceding stage routing device of the client, and send a second address prefix pool to the client, where the second address prefix pool is allocated by an address allocating module to the client; and the address allocating module, configured to obtain, according to the device identifier of the preceding stage routing device, a first address prefix pool that is pre-allocated to the preceding stage routing device, and allocate the second address prefix pool to the client according to the first address prefix pool, where an address range corresponding to the second address prefix pool falls within an address range corresponding to the first address prefix pool.

An embodiment of the present invention further provides a system for allocating an address in an IP network. The system for allocating an address includes a server, at least one routing device, and a client, where the server is connected to the client through the at least one routing device, and the server is configured to receive a request message from the client, where the request message carries a device identifier of a preceding stage routing device of the client, obtain, according to the device identifier of the preceding stage routing device, a first address prefix pool that is pre-allocated to the preceding stage routing device, allocate a second address prefix pool to the client according to the first address prefix pool, where an address range corresponding to the second address prefix pool falls within an address range corresponding to the first address prefix pool, and send the second address prefix pool to the client.

In embodiments of the present invention, a server pre-allocates a first address prefix pool to a preceding stage routing device of a client, so that a second address prefix pool may be allocated to the client according to the first address prefix pool. Configuration information only needs to be configured on the server in a unified manner and does not need to be configured on corresponding routing devices respectively, thus decreasing complexity of a configuration operation, so that efficiency of allocating an address is improved.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

In order to make the objectives, technical solutions, and advantages of the embodiments of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

Figure 1:
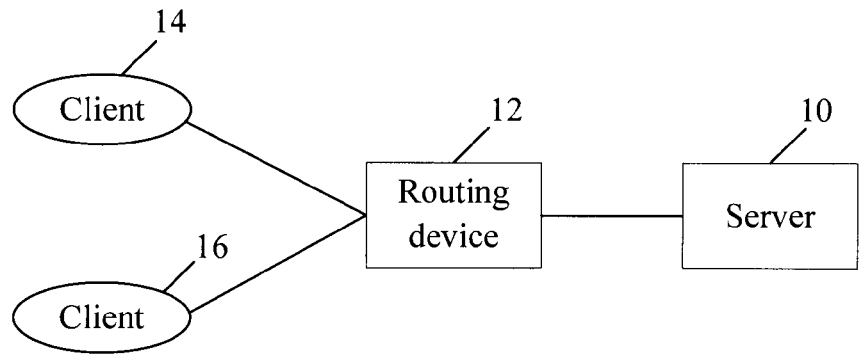
FIG. 1 is a diagram of a network architecture on which an embodiment of the present invention is based.

In an IP network, a server may be connected to one or multiple clients through one stage or multiple stages of routing devices. As shown in FIG. 1, the server here may be a DHCP server or an access node control protocol (Access Node Control Protocol, ANCP) server. A DHCP server can support the DHCPv4 protocol or DHCPv6 protocol. If the server is an ANCP server, the ANCP server may also be connected with the DHCP server, so that address prefix pool information may be obtained from the DHCP server. The routing device here may be an intermediary device such as a router or a switch.

Figure 2:
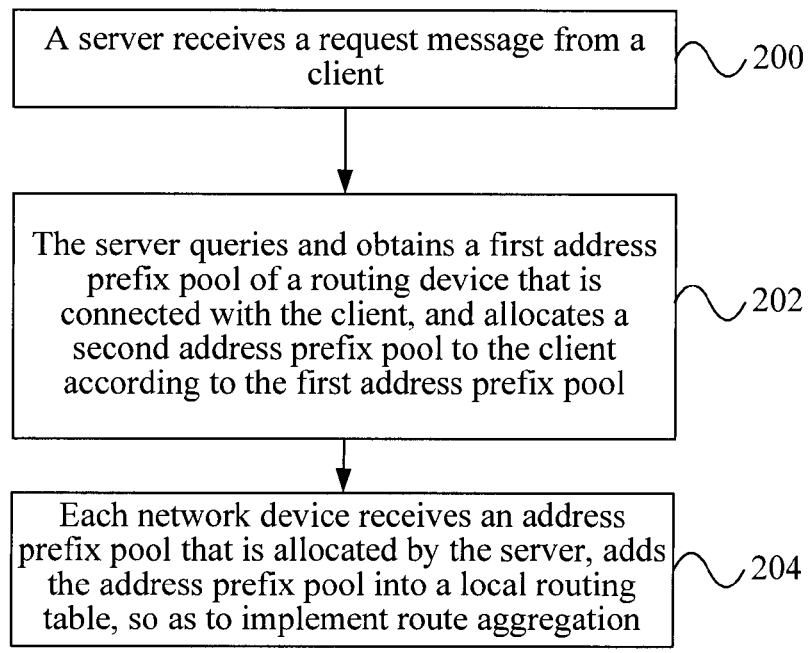
FIG. 2 is a schematic diagram of a procedure of a method for allocating an address in an IP network according to an embodiment of the present invention.

Based on the preceding architecture, an embodiment of the present invention provides a method for allocating an address in an IP network, as shown in FIG. 2, which includes:

Step 200: A server receives a request message from a client, where the client is connected to the server through one stage of or multiple stages of routing devices.

The request message in this embodiment may be a DHCP request message, and may also be a self-defined message.

Step 202: The server queries and obtains a first address prefix pool of a routing device that is connected with the client, and allocates a second address prefix pool to the client according to the first address prefix pool, where the first address prefix pool may include multiple address prefixes, and the second address prefix pool may include at least one address prefix.

In this embodiment, the server needs to pre-allocate, according to an address prefix pool configuration policy, the first address prefix to the routing device that is connected with the client, and the address prefix pool configuration policy here may be a specific rule about how to allocate an address prefix pool, such as a configuration policy based on a topology of network devices that are administrated by or attached to the server, where the network devices that are administrated by or attached to the server may include a routing device and/or a terminal device. In an embodiment shown in FIG. 1, a server 10 maintains a network topology of administrated or attached network devices, allocates a first address prefix pool to a routing device 12 according to a connection relationship between the routing device 12 and clients 14 and 16, where the first address prefix pool may include two address pools, and sends the first address prefix pool to the routing device 12, so that the routing device 12 performs route aggregation by using the first address prefix pool, for example, adds the first address prefix pool to a local routing table so as to implement route aggregation.

Figure 3:
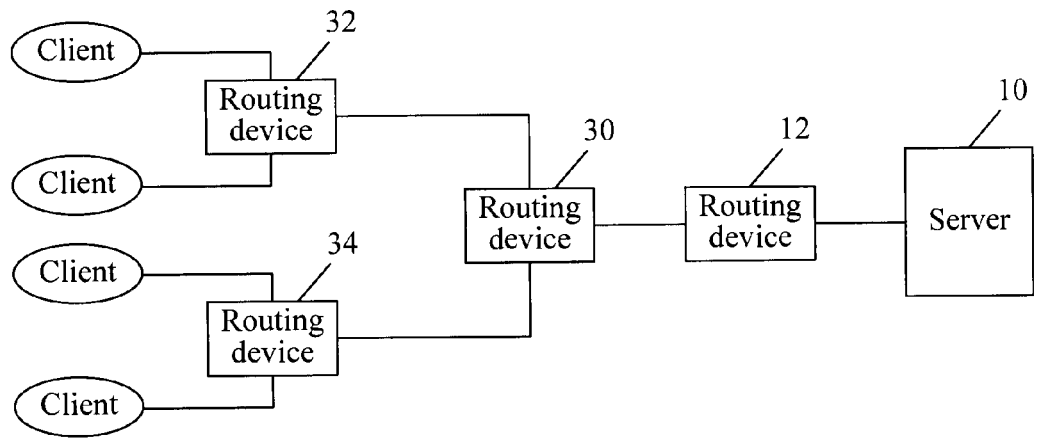
FIG. 3 is a diagram of a network architecture on which an embodiment of the present invention is based.

In an embodiment shown in FIG. 3, multiple stages of routing devices are connected between a server and a client. A routing device 30 may be served as a client of a routing device 12 and initiates a request message to a server 10 through the routing device 12 to request the server 10 to allocate an address prefix pool to the routing device 30. A first address prefix pool has been already allocated to the routing device 12 on the server 10. When the request message for requesting an address prefix pool is received, where the request message is initiated by the routing device 30, a second address prefix pool is allocated to the routing device 30 according to the first address prefix pool that is allocated to the routing device 12, where content included by the second address prefix pool falls within a range of the first address prefix pool, so as to ensure route aggregation. Similarly, routing devices 32 and 34 initiate request messages for requesting address prefix pools to the server 10 through the routing devices 30 and 12. The server may allocate address prefix pools to the routing devices 32 and 34 according to the address prefix pool that is allocated to the routing device 30.

Based on FIG. 3, for example, an IPv6 address prefix pool of each routing device in FIG. 3 may be allocated as follows.

The server 10 may allocate, according to a network topology of network devices that are administrated by or attached to the server 10, an address prefix pool respectively corresponding to each network device in the network topology. A description of network location identifier information of a network device is recorded in network topology information that is used for describing the network topology.

In an embodiment of the present invention, a preceding stage routing device that is connected with a client receives a request message for requesting an address prefix pool, where the request message is initiated by the client to a server. The request message includes a client identifier. The preceding stage routing device adds a device identifier of the preceding stage routing device into the request message and sends the request message to the server. In addition to adding the device identifier of the preceding stage routing device into the request message, the preceding stage routing device may further add a connection identifier of a connection between the client and the preceding stage routing device, such as a port identifier of a port on the preceding stage routing device for being connected with the client or a line identifier of a line between a preceding stage router and the client. The server queries a local record according to a device identifier of a routing device in a received request message, and allocates a second address prefix pool to the client according to a first address prefix pool that is allocated to a routing device corresponding to the device identifier of the routing device in the local record. The server also associates the second address prefix pool with the client, for example, records a table of mapping relationships among a second address prefix pool, network location information of a client, and a client identifier, as shown in Table 1.

TABLE 1

| Serial Number | Device Identifier of Preceding Stage Routing Device | First Address Prefix Pool | Identifier of Connection between Client and Preceding Stage Routing Device (Optional) | Client Identifier | Second Address Prefix Pool |
| --- | --- | --- | --- | --- | --- |
| 1 | Routing device 12 | 2001:1000::/32 | | Routing device 30 | 2001:1000:1000::/48 |
| 2 | Routing device 30 | 2001:1000:1000::/48 | | Routing device 32 | 2001:1000:1000:1200::/56 |
| 3 | Routing device 30 | 2001:1000:1000::/48 | | Routing device 34 | |

Specifically, a server 10 maintains an overall IPv6 address prefix pool and allocates a 32-bit IPv6 address prefix pool 2001:1000::/32 to a routing device 12.

A client on a routing device 30 initiates a request message for requesting an IPv6 address prefix pool through the routing device 12, where the request message carries a client identifier.

The routing device 12 captures the request message, adds a device identifier of the routing device 12 and a connection identifier of a connection between the routing device 12 and the routing device 30 into the request message, and sends the request message including additional information to the server 10. The server 10 receives the request message for requesting an IPv6 address prefix pool, and allocates, according to the device identifier of the routing device 12 in the request message, a 48-bit IPv6 address prefix pool 2001:1000:1000::/48 to the routing device 30 from an address prefix pool 2001:1000::/32 that is allocated to the routing device 12. The server 10 sends the allocated IPv6 address prefix pool 2001:1000:1000::/48 to the routing device 30, associates information in the request message with the IPv6 address prefix pool 2001:1000:1000::/48 that is allocated to the routing device 30, and makes a record in Table 1, for example, creates a record 1 if Table 1 has no record before, and records the device identifier of the routing device 12 in an entry of the Device Identifier of Preceding Stage Routing Device of the record 1, records an address prefix pool of the routing device 12 in an entry of the First Address Prefix Pool, records the device identifier of the routing device 30 in an entry of the Client Identifier, records an address prefix pool of the routing device 30 in an entry of the Second Address Prefix Pool, and optionally, may further record the connection identifier of the connection between the routing device 30 and the routing device 12 in an entry of the Identifier of Connection between Client and Preceding Stage Routing Device.

Similarly, when a client on a routing device 32 initiates a request message for requesting an IPv6 address prefix pool, the server 10 adopts the same method to allocate, according to a device identifier of a routing device 20, where the device identifier of the routing device 20 is carried in the request message, a 56-bit IPv6 address prefix pool 2001:1000:1000:1200::/56 to the routing device 32 from the address prefix pool 2001:1000:1000::/48 that is allocated to the routing device 30. The server 10 sends the allocated IPv6 address prefix pool 2001:1000:1000:1200::/56 to the routing device 32, and associates information in the request message with the IPv6 address prefix pool 2001:1000:1000:1200::/56 that is allocated to the routing device 32, for example, creating a record 2 in Table 1. An address prefix pool of a routing device is obtained by extending the length of an address prefix pool of a preceding stage routing device to which the routing device is connected.

Step 204: Each network device receives an address prefix pool that is allocated by the server, adds the address prefix pool into a local routing table, so as to implement route aggregation.

In this embodiment of the present invention, if the first address prefix pool allocated by the server 10 to the preceding stage routing device (such as the routing device 32 in FIG. 3) of the client is insufficient, the server 10 may allocate a new first address prefix pool (the new first address prefix pool is another address prefix pool, namely, a third address prefix pool) to the preceding stage routing device, and allocates a second address prefix pool to the client according to the new first address prefix pool. The server 10 sends the new first address prefix pool to the preceding stage routing device, and sends the second address prefix pool to the client. In addition, after obtaining the new first address prefix pool allocated by the server 10, the preceding stage routing device also adds the new first address prefix pool into the routing table, so as to further implement completely static aggregation of routing.

In this embodiment, the first address prefix is pre-allocated to the preceding stage routing device of the client, so that the second address prefix pool may be allocated to the client according to pre-configured configuration information and the first address prefix pool that is pre-allocated to the preceding stage routing device of the client. Configuration information only needs to be configured on the server in a unified manner and does not need to be configured on corresponding routing devices respectively, thus decreasing complexity of a configuration operation, so that efficiency of allocating an address is improved.

Figure 4:
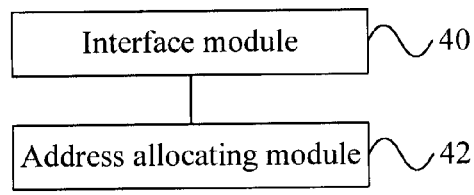
FIG. 4 is a schematic structural diagram of a device for allocating an address in an IP network according to an embodiment of the present invention.

An embodiment of the present invention provides a device for allocating an address. The provided device for allocating an address may be a DHCP server, a DHCPv6 server, or an ANCP sever, and as shown in FIG. 4, includes an interface module 40 and an address allocating module 42.

The interface module 40 is configured to receive a request message from a client, where the request message carries a device identifier of a preceding stage routing device of the client, and send a second address prefix pool to the client, where the second address prefix pool is allocated by the address allocating module 42 to the client.

The address allocating module 42 is configured to obtain, according to the device identifier of the preceding stage routing device, a first address prefix pool that is pre-allocated to the preceding stage routing device, and allocate the second address prefix pool to the client according to the first address prefix pool, where an address range corresponding to the second address prefix pool falls within an address range corresponding to the first address prefix pool.

The request message from the client further carries a client identifier of the client, and the address allocating module 42 is further configured to associate the client identifier with the second address prefix pool.

The address allocating module 42 is further configured to, after receiving the request message, determine that the first address prefix pool of the preceding stage routing device of the client is insufficient, allocate a new first address prefix pool (the new first address prefix pool is another address prefix pool, namely, a third address prefix pool) to the preceding stage routing device, allocate a second address prefix pool to the client according to the new first address prefix pool, and send the new first address prefix pool to the preceding stage routing device.

The interface module 40 is further configured to send the first address prefix pool to the preceding stage routing device.

In this embodiment, the first address prefix is pre-allocated to the preceding stage routing device of the client, so that the second address prefix pool may be allocated to the client according to pre-configured configuration information and the first address prefix pool that is pre-allocated to the preceding stage routing device of the client. Configuration information only needs to be configured on the device for allocating an address in a unified manner and does not need to be configured on corresponding routing devices respectively, thus decreasing complexity of a configuration operation, so that efficiency of allocating an address is improved.

Figure 5:
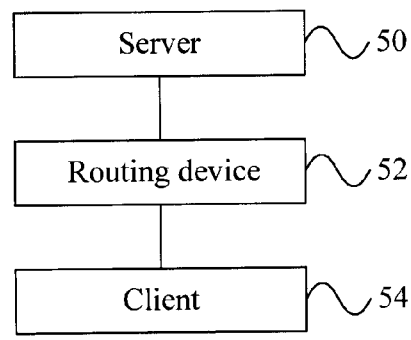
FIG. 5 is a schematic structural diagram of a system for allocating an address in an IP network according to an embodiment of the present invention.

An embodiment of the present invention provides a system for allocating an address. The provided system may be used in an IP network, and as shown in FIG. 5, includes a server 50, a routing device 52, and a client 54. The client 54 is connected with the server 50 through the routing device 52.

The server 50 is configured to receive a request message from the client 54, where the request message carries a device identifier of a preceding stage routing device (the routing device 52 in FIG. 5 in this embodiment) of the client 54, obtain, according to the device identifier of the preceding stage routing device, a first address prefix pool that is pre-allocated to the preceding stage routing device, allocate a second address prefix pool to the client 54 according to the first address prefix pool, where an address range corresponding to the second address prefix pool falls within an address range corresponding to the first address prefix pool, and send the second address prefix pool to the client.

The routing device 52 is configured to forward a message between the client 54 and the server 50, pre-send a request message for requesting allocation of a first address prefix pool to the server 50 after being powered on, and save the first address prefix pool in a local routing table after receiving the first address prefix pool.

The server 50 may, after receiving the request message of the routing device 52, allocate a first address prefix pool to the routing device 52 based on a preset configuration policy, where the configuration policy may be based on a network topology of network devices that are administrated by or attached to the server 50, and after allocating the first address prefix pool to the routing device 52, send the first address prefix pool to the routing device 52 through a response message.

The server 50 may also allocate the first address prefix pool to the routing device 52 after receiving a request message of the client 54, allocate the second address prefix pool to the client 54 according to the first address prefix pool, and through the routing device 52, send a response message including the first address prefix pool and the second address prefix pool to the client 54. After receiving the response message, the routing device 52 saves the first address prefix pool locally, for example, saves the first address prefix pool in a local routing table.

Multiple routing devices may be connected between the client 54 and server 50 in this embodiment.

In the system for allocating an address provided in this embodiment, an address prefix pool is pre-allocated to a preceding stage routing device of a client, the allocated address prefix pool is sent to a routing device to be saved locally, and after receiving a request of the client, a part is separated from the address prefix pool of the preceding stage routing device for the client, so that each relay routing table is more stable, and aggregation network routes are less.

Persons of ordinary skill in the art may understand that all or a part of the steps of the preceding method embodiments may be implemented by a program instructing relevant hardware. The program may be stored in a computer readable storage medium. When the program runs, the steps of the preceding method embodiments are executed. The storage medium may include any medium that is capable of storing program codes, such as an ROM, an RAM, a magnetic disk, or an optical disk.

Finally, it should be noted that the preceding embodiments are merely provided for describing the technical solutions of the present invention, but are not intended to limit the present invention. It should be understood by persons of ordinary skill in the art that although the present invention has been described in detail with reference to the preceding embodiments, modifications may still be made to the technical solutions described in the preceding embodiments, or equivalent replacements may be made to some technical features in the technical solutions, however, these modifications or replacements do not make the essence of corresponding technical solutions depart from the spirit and scope of the technical solutions in the embodiments the present invention.

What is claimed is:

1. A method for allocating an address in an IP network, the method comprising:

receiving, by a server, a request message from a client, wherein the client is connected to the server through at least one routing device, and the request message received by the server carries a device identifier of a preceding stage routing device;

obtaining, by the server, according to the device identifier of the preceding stage routing device, a first address prefix pool that is pre-allocated to the preceding stage routing device, allocating a second address prefix pool to the client according to the first address prefix pool, wherein an address range corresponding to the second address prefix pool falls within an address range corresponding to the first address prefix pool; and sending, by the server, the second address prefix pool to the client;

wherein corresponding relationships among the device identifier of the preceding stage routing device, the first address prefix pool, a client identifier, and the second address prefix pool are saved on the server; and the server queries, according to the device identifier of the preceding stage routing device, the corresponding relationships to obtain the first address prefix pool of the preceding stage routing device, allocates the second address prefix pool to the client according to the first address prefix pool of the preceding stage routing device, and associates a client identifier carried in the request message with the second address prefix pool.

2. The method according to claim 1, wherein after receiving the request message, the server determines that the first address prefix pool of the preceding stage routing device of the client is insufficient, allocates a new first address prefix pool to the preceding stage routing device, allocates a second address prefix pool to the client according to the new first address prefix pool, and sends the new first address prefix pool to the preceding stage routing device.

3. The method according to claim 1, wherein after receiving the request message, the server determines that the first address prefix pool of the preceding stage routing device of the client is insufficient, allocates a new first address prefix pool to the preceding stage routing device, allocates a second address prefix pool to the client according to the new first address prefix pool, and sends the new first address prefix pool to the preceding stage routing device.

4. A device for allocating an address in an IP network, wherein the device for allocating an address is connected to a client through at least one routing device, and the device for allocating an address comprises:
   an interface module, configured to receive a request message from the client, wherein the request message carries a device identifier of a preceding stage routing device, and send a second address prefix pool to the client, wherein the second address prefix pool is allocated by an address allocating module to the client;
   the address allocating module, configured to obtain, according to the device identifier of the preceding stage routing device, a first address prefix pool that is pre-allocated to the preceding stage routing device, and allocate the second address prefix pool to the client according to the first address prefix pool, wherein an address range corresponding to the second address prefix pool falls within an address range corresponding to the first address prefix pool;
   wherein the device further comprises a memory configured to store corresponding relationships among the device identifier of the preceding stage routing device, the first address prefix pool, a client identifier, and the second address prefix pool; and
   wherein the address allocating module is further configured to:
   query according to the device identifier of the preceding stage routing device, the corresponding relationships to obtain the first address prefix pool of the preceding stage routing device,
   allocate the second address prefix pool to the client according to the first address prefix pool of the preceding stage routing device, and
   associate a client identifier carried in the request message with the second address rep pool.

5. The device according to claim 4, wherein the request message further carries a client identifier of the client, and the address allocating module is further configured to associate the client identifier with the second address prefix pool.

6. The device according to claim 5, wherein the address allocating module is further configured to, after receiving the request message, determine that the first address prefix pool of the preceding stage routing device of the client is insufficient, allocate a new first address prefix pool to the preceding stage routing device, allocate a second address prefix pool to the client according to the new first address prefix pool, and send the new first address prefix pool to the preceding stage routing device.

7. The device according to claim 4, wherein the address allocating module is further configured to, after receiving the request message, determine that the first address prefix pool of the preceding stage routing device of the client is insufficient, allocate a new first address prefix pool to the preceding stage routing device, allocate a second address prefix pool to the client according to the new first address prefix pool, and send the new first address prefix pool to the preceding stage routing device.

8. A system for allocating an address in an IP network, the system comprising a server according to claim 4, and a client, wherein the server connects to the client through at least one routing device.

9. The system according to claim 8, wherein the routing device is configured to pre-send a request message for requesting allocation of a first address prefix pool to the server after being powered on, and save the first address prefix pool in a local routing table after receiving the first address prefix pool.

* * * * *